Nov. 27, 1945.                J. J. WISLER                2,389,945
                       AIR COOLED OFFSET TIP ELECTRODE
                            Filed April 1, 1944

Inventor
John J. Wisler
by
Walter + Kaufman
Attorney

Patented Nov. 27, 1945

2,389,945

UNITED STATES PATENT OFFICE 2,389,945

AIR-COOLED OFFSET TIP ELECTRODE

John J. Wisler, Columbia, Pa., assignor to Armstrong Cork Company, Lancaster, Pa., a corporation of Pennsylvania Application April 1, 1944, Serial No. 529,067

3 Claims. (Cl. 219—4)

This invention relates to an offset tip electrode for resistance type spot welding machines. It is particularly concerned with a tip which will permit access into small confined areas such as are frequently encountered in fabrication of airplane parts and the like from aluminum alloys.

In the spot welding of aluminum alloys, it is desirable to establish a condition of thermal equilibrium as rapidly as possible on the electrode face adjacent to the zone of the weld and to maintain a temperature of the electrode tip at an optimum low value, generally of the order of 10° C. or less. When these conditions are not satisfied, the symmetry of the weld shape is poor and the shear strength is low due to failure to establish thermal equilibrium rapidly, and frequent cleaning of the electrode faces is necessary because of undesirable overheating.

It is an object of my invention to provide an offset tip welding electrode having provision for rapidly dissipating heat from the working surface of the tip where heat is generated in the welding operation.

A further object is to provide an offset tip welding electrode provided with heat dissipating means and so designed as to be structurally strong to obviate deleterious deflection at pressures normally encountered in welding.

With certain types of offset tips, it is possible to provide for fluid cooling. For example, this may be accomplished by directing cooling water to the tip in a conduit disposed in good heat conducting relationship with the tip. Such an arrangement is disclosed in my copending application Serial No. 529,068, filed April 1, 1944, and entitled Fluid cooled offset tip electrode. With small offset welding tips, however, it is not possible to provide for such cooling. The present invention is directed to an offset tip electrode which is cooled by rapid dissipation of heat from the tip into the surrounding atmosphere.

The accompanying drawing illustrates one form of my invention. In the drawing.

All of the figures are to an enlarged scale for convenience of illustration.

The electrode includes a body, a tip 3, and a sub-base 4 which is received within a spot welding machine horn, arm, or extension thereof. The sub-base 4 is provided with a central screw threaded opening 5 to receive a hollow head set screw or the like which is used to secure the electrode into tight, firm, and good heat and electric current conducting relationship with the welding machine horn, arm, or extension thereof.

Figure 1:
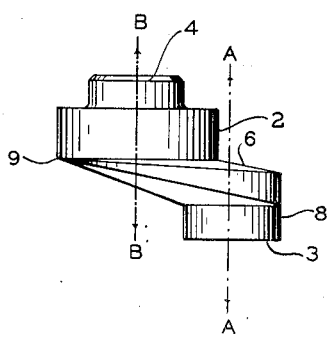
Figure 1 is an inverted side elevation of an offset tip welding electrode embodying my invention.
Figure 3:
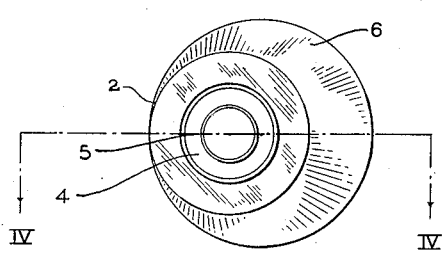
Figure 3 is a bottom plan view of the electrode shown in Figure 1.
Figure 2:
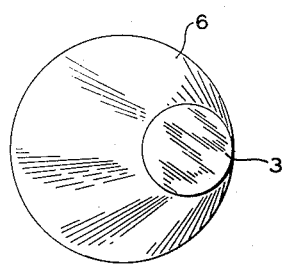
Figure 2 is a top plan view of the electrode of Figure 1.
Figure 4:
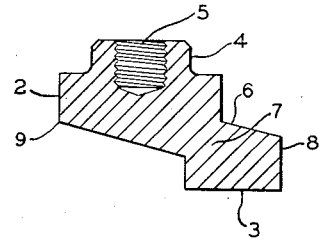
Figure 4 is a sectional view taken on the line IV—IV of Figure 3.

It will be observed that the vertical axis A—A of the welding tip 3 is offset radially from the vertical axis B—B of the support 2. Also, the upper portion of tip 3 is disposed in a horizontal plane substantially below the plane of the lower portion of the body 2. The body 2 and tip 3 are connected by a cooling fin or web 6. Referring to Figures 2 and 3, it will be noted that the web 6 is substantially circular in plan and is substantially greater in diameter than the diameter of either the body 2 or the tip 3. In the preferred embodiment shown in the drawing, the center of the body 2 and the center of the tip 3 lie along a line drawn through the center of the web 6 with the body 2 and tip 3 overlapping each other for a portion of their extent. As illustrated in Figure 4, this provides a relatively heavy section 6 between the body 2 and the tip 3 which serves to produce a rigid structure and avoids any tendency toward deflection of the tip during welding. In welding aluminum alloys, such as 24 ST Alclad in a thickness of .040", a welding force of 720 pounds or more may be developed between the electrodes and a forging force 1540 pounds or more may be used in consummation of the weld. It is necessary, therefore, to provide a tip structure which will be relatively rigid and will not deflect to an excessive extent under welding and forging pressures encountered in use.

Figure 5:
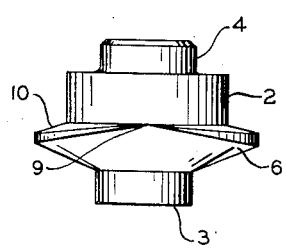
Figure 5 is a side elevation looking from the rear of the electrode of Figure 1.

The fin 6 is of gradually diminishing cross section from a point adjacent the front or nose portion 8 of the tip 3 toward a point 9 at the rear where it joins the body 2. The upper surface 10, as best shown in Figure 5, is flared downwardly and outwardly to reduce the section or thickness and provide greater surface area for heat dissipation.

In actual commercial operation, I have used an electrode having a tip ⅜" in diameter by ⅛" thick, a body ⅝" in diameter and ⅜" thick, the two being connected by a fin having an outer diameter of ⅞" and a thickness of ⅛" at the nose, tapering to zero thickness at the rear of the body. This performed satisfactorily with a welding force of 800 pounds and a forging force of 1600 pounds. The size of the various parts will depend to a considerable extent upon the area available at the point of welding, but for all practical purposes, a tip of the dimensions mentioned above has been found to operate very satisfactorily, producing consistent welds in joining two pieces of aluminum alloys each up to .064" thick. By providing for adequate heat dissipation thermal stability can be maintained and, as each succeeding weld is initiated, the temperature of the tip will be at or about the desired low point, normally in the order of 10° C.

While it is preferred to manufacture the tip from a single piece of metal as shown in the drawing, it may be built up or fabricated from smaller pieces joined together mechanically or by means of soft solder or the like. Commercially available copper-chrome or copper-cadmium alloys having 80% I. A. C. S. conductivity and an ultimate strength of 65,000 pounds per square inch has been found satisfactory for such tips.

With the electrode of the present invention, it is possible to rapidly dissipate heat into the surrounding atmosphere because of the extensive surface area of the fin which is effective for conducting heat away from the tip. Since heat may be rapidly removed from the working face of the tip, cleaning of the work face is less frequently required and this eliminates considerable downtime of the welding machine. The tip is sufficiently rigid for all practical purposes and is small and compact so that it may be fitted into relatively small places where an ordinary offset tip electrode could not be positioned, particularly if provided with external water cooling means.

While I have described and illustrated a preferred embodiment of my invention, it will be understood my invention is not limited thereto since it may be otherwise embodied within the scope of the following claims.

I claim:

1. A single piece offset tip welding electrode formed of copper alloy or like heat and electrical current conducting metal comprising a substantially cylindrical body portion, a substantially cylindrical tip, the vertical axes of the body and tip portions being substantially parallel but offset transversely from one another, and a web of extensive surface area integrally joining the body and tip, said web being of thin section adjacent the body and tapering to substantially greater section adjacent the tip, said web extending radially beyond the tip to provide an extensive area for the dissipation of heat from said tip.

2. An integral, single piece offset tip welding electrode comprising a tip portion having a working surface at which heat is generated in use, a body portion provided with means for attaching the electrode to an electrode holder, the vertical axes of the tip and body portions being substantially parallel, with the tip portion being spaced horizontally and vertically from the body portion, and a web of tapering cross section joining the tip to the body, said web extending radially beyond the tip and body portions throughout at least a major portion of the periphery of each and providing an extensive surface area for dissipation of heat from the working surface of said tip.

3. An integral, single piece offset tip spot welding electrode comprising a tip portion having a working surface at which heat is generated in use, a body portion provided with means for attaching the electrode to an electrode holder, the tip portion being spaced both horizontally and vertically from the body portion, and a web connecting the tip and body portions, said web being substantially circular in plan and tapering from a zone of greatest cross section in the vicinity of the tip to prevent deflection in use to a substantially zero cross section at the zone of the rear surface of the body, the diameter of said web being substantially greater than the diameter of said body portion and said web being tapered in both upper and lower surfaces to provide extensive surface areas for heat dissipation to the surrounding atmosphere.

JOHN J. WISLER.